Patented Apr. 24, 1934

1,956,111

UNITED STATES PATENT OFFICE 1,956,111

PROCESS FOR THE PRODUCTION OF ACID DISODIUM PYROPHOSPHATE

Conway, Baron von Girsewald, Hans Weidmann and Gerhard Roesner, Frankfort-on-the-Main, Germany, assignors to American Lurgi Corporation, New York, N. Y., a corporation of New York No Drawing. Application April 9, 1931, Serial No. 528,976. In Germany May 1, 1930

8 Claims. (Cl. 23—107)

This invention relates to a process for the production of mono-sodium phosphate.

Numerous proposals have already been made in connection with the production of pure acid sodium pyrophosphate, which is employed, more particularly, as an acid addition to carbonates, such as sodium bicarbonate, in the producing of raising agents for baking purposes. It may for example be prepared, in a simple manner, by heating monosodium phosphate at 200–220° C. A pyrophosphate of the high degree of purity necessary for the said purposes, naturally also requires a phosphate of equal purity, but the preparation of such pure alkali monophosphates is attended with difficulties.

The apparently obvious method of treating pure phosphoric acid with, for example, sodium carbonate until the monosodium phosphate is formed, and crystallizing-out, or separating the salt from the resulting solution, fails because sufficiently pure phosphoric acid for this purpose is unavailable commercially, and the impurities (such as compounds of Ca, Fe, Al, As and the like) present in the technical acid remain in the acid solution, during the neutralization process, which is only carried as far as the mono-salt stage.

The usual practice therefore, in the production of pure monophosphate, is to start with the di-phosphate, which is obtained in a pure state from technical phosphoric acid (such as that obtained in Dorr concentraters) by first freeing the acid from the said impurities by precipitation with ammonia, and then crystallizing-out the disalt $Na_2HPO_4$.

For the further conversion of the disalt into the mono-salt or into the acid pyro-salt, it has been proposed to separate the phosphoric acid from a solution of pure disodium phosphate, as secondary calcium phosphate, by means of calcium chloride, and to convert it, with sodium bisulphate into monosodium phosphate, which is then purified by recrystallization and can be converted into the pyro-salt by heating at 200 to 220° C.

According to another proposal, pure phosphoric acid is prepared by treating normal di- (or also tri-) phosphate with the necessary amount of nitric, sulphuric or hydrochloric acid for combining with all the alkali present, and separating the resulting sodium nitrate, sulphate or chloride, by recrystallization, and then forming the mono-salt by neutralizing this free phosphoric acid with pure disodium phosphate or sodium carbonate. This process as well as that above described for the partial treatment of phosphoric acid with sodium carbonate, are attended with the drawback that the impurities in the phosphoric acid pass over into the resulting product.

It has also been proposed to treat tri- or di-sodium phosphate with only sufficient sulphuric acid to form the mono-salt, then concentrating to 60° Bé. strength, remove the deposited anhydrous sodium sulphate ($Na_2SO_4$) and cool down the mother liquor after dilution with water, whereupon the monosodium phosphate should separate out in the crystalline form. Alternatively, the reaction between the disodium phosphate and the corresponding quantity of sulphuric acid is effected at the boiling temperature of the solution, in presence of just so much water as is needed for solution, followed by cooling, during which $Na_2SO_4$ is again the first to crystallize out. After its removal, the monosodium phosphate remaining in the solution is deposited by concentration.

According to the present invention, the production of monosodium phosphate is effected by treating the di- or tri-salt with the amount of sulphuric acid necessary for forming the mono-salt and separating the resulting sodium sulphate, in the form of Glauber salt, by suitably cooling the solution, under which conditions—in consequence of the fixation of water of crystallization in the resulting Glauber salt, and the salting-out action of the monophosphate—the advantage is obtained—as compared with the separation in the anhydrous form according to the known method last mentioned—that the resulting solution of monophosphate can be obtained with a far higher phosphate-ion concentration, and far lower $SO_4$-ion concentration, and furnishes a substantially higher yield of solid monophosphate with substantially lower contamination with sulphate. The salt separated in this manner can be easily freed, completely or practically so, from the small residual content of alkali sulphate, by recrystallization.

The following is a typical method of operating in accordance with the invention:

Tri- or di-sodium phosphate in dissolved, or preferably solid, form is treated with pure sulphuric acid until the solution just begins to redden methyl orange. The employment of the salt in the solid form has been found specially advantageous insofar that the troublesome frothing, otherwise readily occurring in the solutions, is absent. The resulting, still warm solution is then diluted to a phosphorus content of about 60–80 grms. per litre, and cooled to 0° C. After the Glauber salt which comes down is removed, a solution of monosodium phosphate with over 100 grms. of phosphorus and less than 20 grms. of SO₃ per litre, is obtained. This solution is evaporated down to a concentration of about 250 grms. of phosphorus per litre, and is then cooled to room temperature. About 60-70% of the phosphorus content thereupon separates out in the form of crystallized monosodium phosphate, containing at most 0.2% of SO₃. It can be completely freed from sulphate by recrystallization. The mother liquor is preferably returned to the process.

Instead of a phosphorus content of about 60-80 grms. per litre, the solution to be cooled may also have a lower content thereof. In general, the amount of sulphate present in the resulting monophosphate will vary inversely with the content of monophosphate in the solution prior to cooling. However phosphorus contents of over 80 grams per liter are to be avoided as the amount of sulphate present in the resulting monophosphate begins to increase rapidly above that concentration. The cooling temperature may, naturally, also vary within wide limits. Thus for example, the temperature may be only lowered to about +5° C., instead of to 0° or —5° C. (or lower). As a rule, substantially higher deposition temperatures are not advisable because, at such higher range, the solubility of the sodium sulphate increases rapidly with the temperature. Moreover, the deposition temperature to be employed naturally stands in a certain relation to the phosphorus concentration of the solution which is to be cooled, insofar that, in general, lower deposition temperatures enable lower initial phosphorus concentrations—e. g. down to 50 grms. or less per litre—to be employed, and vice versa. Since the Glauber salt deposited at the specified low temperatures fixes a very considerable quantity of the water as water of crystallization, this circumstance, in itself, as already mentioned, effects a dehydration which increases the concentration of the residual monophosphate solution.

The production of the monosodium phosphate from trisodium phosphate, in the manner described, can be effected, with particular advantage, as a cyclical process in conjunction with the production of the trisodium phosphate by heating compounds of metals with phosphorus—especially ferro-phosphorus—with sodium sulphate in known manner, since on the one hand by reason of its high purity, the trisodium phosphate prepared in the specified manner, is particularly suitable for the said reaction, and on the other, the sodium sulphate (for example) recovered in this manner can be again used directly after dehydration—for the decomposition of fresh quantities of ferro-phosphorus.

The monophosphate obtained in accordance with the present invention can be converted into the acid pyrophosphate $Na_2H_2P_2O_7$, in known manner, by dehydration, for example at a temperature of 200-220° C. It has been ascertained that the dehydration can be performed, with advantage at lower temperatures, if the monophosphate (or, initially, a solution of same) be heated, under reduced pressure—for example less than 200 mm. of mercury—at temperatures—for example even below 200° C.—at which dehydration occurs without any, or any appreciable, formation of metaphosphate—for example about 190° C., under a pressure of about 100 mm. It has been found that this method furnishes a pyrophosphate which is either extensively, or completely free from ortho- and meta-phosphate.

Example 10 kg. of purest crystalline trisodium phosphate, prepared by acting on ferro-phosphorus with sodium sulphate are treated with 1.6 litres of sulphuric acid (sp. gr. 1.84) free from arsenic, the mixture becoming liquid without any considerable frothing. The precise adjustment of the amount of acid is controlled by means of methyl orange, the acid being added to a point at which the methyl orange just begins to redden; the solution is then diluted to a phosphorus content of 60 grms. per litre and cooled to 0° C. 9.9 kg. of Glauber salt are deposited, and can be freed from the mother liquor down to a phosphorus content of only 0.3%, for example by centrifuging and finally washing in the centrifuge. The mother liquor separated from the crystals now contains 105 grms. of phosphorus per litre, and only 12 grms. of SO₃ per litre, as the result of the removal of water as water of crystallization in the Glauber salt. 7.5 litres of this liquor are concentrated to about 3 litres—that is to say, about 250 grms. of phosphorus per litre. By gradual cooling to about 20° C., 2.6 kg of monosodium phosphate, containing 20% of phosphorus—or 65% of the total phosphorus content—are deposited from the concentrate. The only impurity in the salt is about 0.1% of SO₃, from which it can be completely freed by recrystallization. Finally, the monosodium phosphate is converted into acid pyrophosphate by heating to 190° C. under a pressure of 100 mm. Hg. This product is free from ortho- and meta-phosphate, dissolves to a perfectly clear solution in water, and corresponds, in composition and acidity, to the formula $Na_2H_2P_2O_7$. The mother liquor, washings and final crystalization liquors can be returned to the process, and employed in the conversion of fresh trisodium phosphate with sulphuric acid. The recovered Glauber salt is preferably calcined and again converted into trisodium phosphate by means of ferro-phosphorus.

We claim:

1. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ with the requisite amount of sulphuric acid for converting it into mono-phosphate, adjusting the solution thus obtained to a phosphorus content not exceeding 80 grams of phosphorus per liter, separating the sodium sulphate contained in the resulting solution as Glauber's salt at a temperature below 32.4° C. and crystallizing the mono-sodium phosphate out of the mother liquor.

2. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating trisodium phosphate with the requisite amount of sulphuric acid for converting it into monophosphate, adjusting the solution thus obtained to a phosphorus content not exceeding 80 grams of phosphorus per liter, separating the sodium sulphate contained in the resulting solution, as Glauber's salt at a temperature below 32.4° C., and crystallizing the mono-sodium phosphate out of the mother liquor.

3. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ and present, at least in part, in solid form, with the requisite amount of sulphuric acid for converting it into mono-phosphate, adjusting the solution thus obtained to a phosphorus content not exceeding 80 grams of phosphorus per liter, separating the sodium sulphate contained in the resulting solution as Glauber's salt at a temperature below 32.4° C. and crystallizing the mono-sodium phosphate out of the mother liquor.

4. Process for the production of mono-sodium phosphate which is free from the impurities in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ with the requisite amount of concentrated sulphuric acid for converting it into mono-phosphate, adjusting the solution thus obtained to a phosphorus content not exceeding 80 grams of phosphorus per liter, separating the sodium sulphate contained in the resulting solution, as Glauber's salt at a temperature below 32.4° C. and crystallizing the mono-sodium phosphate out of the mother liquor.

5. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ with the requisite amount of sulphuric acid for converting it into mono-phosphate, adjusting the solution thus obtained to a phosphorus content not exceeding 80 grams of phosphorus per liter, cooling the solution to a temperature not substantially above + 5° C. separating the deposited Glauber's salt and crystallizing out the mono-sodium phosphate from the mother liquor.

6. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ with the requisite amount of sulphuric acid for converting it into mono-phosphate, adjusting the solution thus obtained to a phosphorus content not exceeding 80 grams of phosphorus per liter, cooling the solution to a temperature between + 5° C. and − 5° C. separating the deposited Glauber's salt and crystallizing out the mono-sodium phosphate from the mother liquor.

7. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ with the requisite amount of sulphuric acid for converting it into mono-phosphate, adjusting the solution thus obtained to a content of about 50–80 grms. of P per litre, separating the sodium sulphate contained in the resulting solution, as Glauber's salt at a temperature below 32.4° C. and crystallizing the mono-sodium phosphate out of the mother liquor.

8. Process for the production of mono-sodium phosphate which is free from the impurities originating in the technical phosphoric acid used in the production of monosodium phosphate in the ordinary way and is therefore especially adapted for the production of pure acid disodium pyrophosphate, $Na_2H_2P_2O_7$, by heating which comprises treating a sodium phosphate having more than 1 atom of sodium to 1 molecule of $H_3PO_4$ with the requisite amount of sulphuric acid for converting it into mono-phosphate, separating the sodium sulphate contained in the resulting solution as Gluber's salt at a temperature below 32.4° C., crystallizing the mono-sodium phosphate out of the mother liquor, and converting the previously obtained sodium sulphate, by reaction with ferro-phosphorus at elevated temperature and leaching the transposition product, into a sodium phosphate containing more than 1 atom of Na to 1 molecule of $H_3PO_4$, said phosphate being again converted, in a cyclical operation, into mono-sodium phosphate and sodium sulphate by means of sulphuric acid in the above described manner.

CONWAY, BARON von GIRSEWALD,
HANS WEIDMANN.
GERHARD ROESNER.